J. C. W. STANLEY.
APPARATUS FOR TREATING FISH OIL AND THE LIKE.
APPLICATION FILED MAR. 21, 1921.

1,425,803.

Patented Aug. 15, 1922.
2 SHEETS—SHEET 1.

INVENTOR.
John C. W. Stanley;
BY R. S. Berry
ATTORNEY.

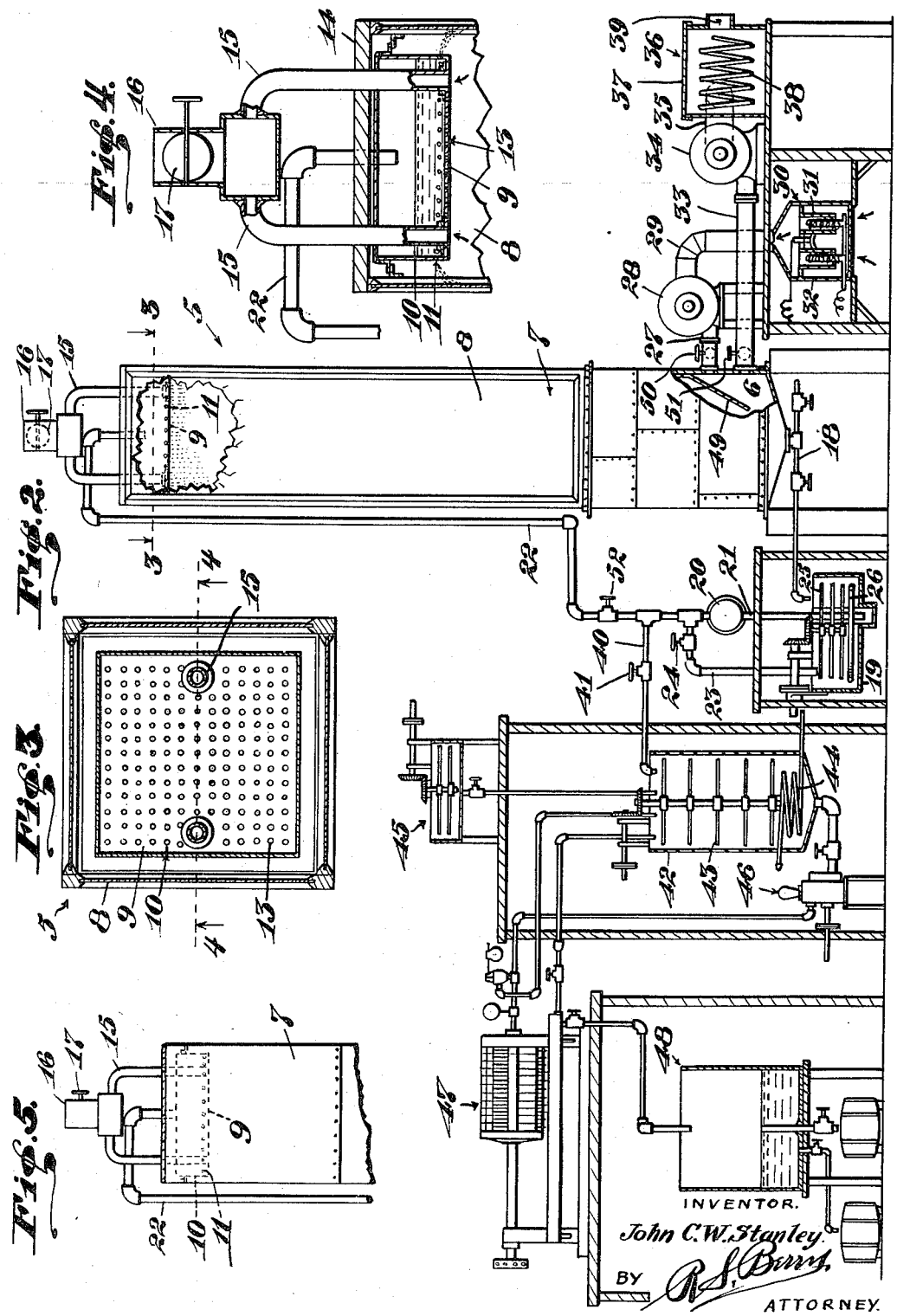

UNITED STATES PATENT OFFICE.

JOHN C. W. STANLEY, OF LONG BEACH, CALIFORNIA, ASSIGNOR TO THE TITLE GUARANTEE AND TRUST COMPANY, OF LOS ANGELES, CALIFORNIA, A CORPORATION OF CALIFORNIA.

APPARATUS FOR TREATING FISH OIL AND THE LIKE.

1,425,803.   Specification of Letters Patent.   Patented Aug. 15, 1922.

Application filed March 21, 1921. Serial No. 454,217.

*To all whom it may concern:*

Be it known that I, JOHN C. W. STANLEY, of Long Beach, in the county of Los Angeles, State of California, a subject of the King of England, chemical engineer, have invented new and useful Improvements in Apparatus for Treating Fish Oil and the like, and that I do hereby declare the nature of this invention and in what manner the same is to be performed to be particularly described and ascertained in and by the following statement.

This invention particularly pertains to an apparatus for treating or refining crude fish oil to free it from objectionable odors and render it more suitable for use in the arts, as in the manufacture of paints, varnishes and the like and in the treatment of fibers, cordage, leather and other materials, and also render oils of this character suitable for use as an edible oil.

An object of this invention is to provide a means whereby an oil may be so intimately commingled with and exposed to ozone as to accomplish a thorough sterilization and effect deodorization and bleaching thereof.

Another object is to provide a means whereby an oil may be subjected for a period of any suitable duration to the action of dilute ozone, embodying means by which a large volume of air and a relatively small volume of ozone may be thoroughly intermixed and passes into intimate contact with finely divided jets or sprays of the oil, in such manner as to insure a complete sterilizing action on the oil.

A further object is to provide an apparatus whereby an oil may be rained through a current of ozone laden air and at the same time exposed to the action of the sun's rays.

The apparatus for carrying the invention into effect is illustrated in the accompanying drawings, in which:—

Figure 2 is a view in elevation of same partly in section.

Figure 3 is an enlarged view in horizontal section as seen on the line 3—3 of Figure 2.

Figure 4 is a detail vertical section on line 4—4 of Figure 3.

Figure 5 is a detail of the upper portion of the tower showing a modified form of the invention.

Figure 1:
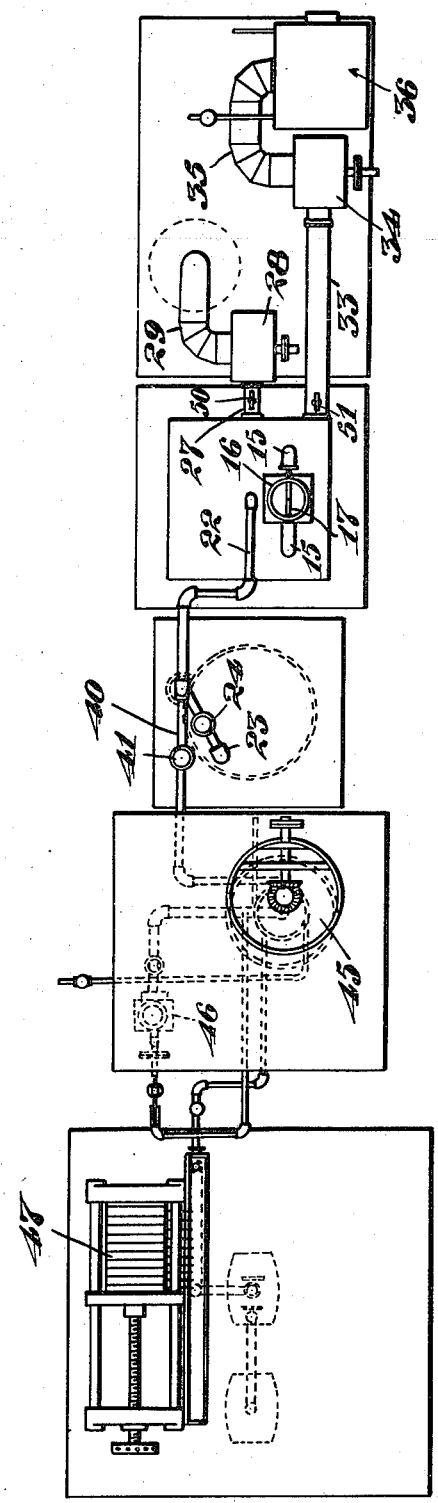
Figure 1 is a plan view of the apparatus.

More specifically, 5 indicates a closed tower forming an ozonating chamber and comprises a well 6 and a housing 7, the latter preferably being formed with glass panels 8 to admit sunlight to the interior of the tower to illuminate the ozonating chamber, but may be non-transparent as shown in Figure 5. A sprayer pan 9 located in the upper portion of the tower has side walls 10 extending close to but spaced from the walls of the tower and formed with fine perforations 11. The bottom of the pan is formed with a series of fine perforations 13 to cause a rain of the oil to fall throughout the horizontal sectional area of the tower. The pan thus serves to form both a thin film or stream of the oil throughout the inner surface of the tower and a shower of drops of the oil throughout the ozonating chamber.

A wall 14 closes the top of the tower through which vent pipes 15 extend; the lower ends of which open through the bottom of the pan and the upper ends of which connect with a stack 16 fitted with a damper 17. A discharge pipe 18 leads from the tower to a reservoir 19 in which the oil to be treated is placed. A pump 20 has an intake pipe 21 extending into the reservoir and an outlet pipe 22 leading to the top of the tower and discharging into the pan; a vent pipe 23 leading from the outlet pipe adjacent the pump to the reservoir and having a regulating valve 24 by means of which the volume of oil delivered to the pan may be regulated, so that on closing the valve the pump will operate to its capacity, but on opening the valve a part of the oil raised by the pump will pass directly back to the reservoir. Agitators 25 and a heating coil 26 are arranged in the reservoir.

Opening to the lower portion of the tower is an air and ozone discharge pipe 27 connecting with a blower 28, the inlet of which is fitted with an intake pipe 29 connected with an ozonator 30 embodying the usual tubes 31 arranged in a housing 32, through which air is drawn by the blower and ozone formed by subjecting the air flowing through the tubes to the action of an electrical current. The blower is so designed that a relatively large volume of air will be caused to run through the ozonator in proportion to the volume of ozone formed, so that a small volume of ozone will be carried by a large volume of air, thus diluting the ozone.

An air discharge pipe 33 leading from a blower 34 connects with the lower portion of the tower through which warm air may be delivered to the latter; the intake of the blower connecting with a pipe 35 leading from an air heater 36 comprising a housing 37 encompassing steam coils 38 and formed with an air inlet 39.

A pipe 40 fitted with a valve 41 leads from the pipe 22 to a tank 42 having agitators 43 and heating coil 44 to which a pulverulent material, such as diatomaceous earth is delivered from a mixer 45 to incorporate a powdered solid material with the oil, which is thereafter discharged from the tank by a pressure pump 46 and delivered to a filter press 47 where the oil is filtered and then delivered to a reservoir 48 for containing the finished product, and from which the oil is discharged into containers.

In the operation of the invention, the oil to be treated is delivered to the pan 10, from which a portion of the oil is sprayed substantially horizontally against the sides of the tower and a portion falls like rain from the underside of the pan.

The oil flows into the well and passes back to the reservoir through the pipe 18, where it may be heated and agitated. The oil may be thus circulated through the tower any desired length of time. During this circulation of the oil, the blower 28 is operated to discharge a large volume of air with a small proportion of ozone to the lower portion of the tower, which passes upwardly and is brought into intimate contact with the particles of the liquid passing downwardly in the tower and also flows upwardly over the surface of the downwardly flowing film of oil on the walls of the tower; the vent damper 17 being opened to permit the air to pass out the upper end of the tower; the oil thus being subjected to the action of dilute ozone which will have a sterilizing, deodorizing and bleaching effect on the oil. After the oil has thus been treated the supply of ozone may be cut off and the process continued by passing heated air through the tower which is effected by means of the blower 34.

In some instances the oil may be subjected to the action of heated air before treating it with the ozonated air and in some cases both heated air and ozonated air may be passed through the tower at the same time. By adjusting the damper 17, a slight pressure may be created within the tower which augments the action of the ozonated air on the oil.

Where the walls of the tower are formed of glass and located to limit sunlight to the interior of the tower, the sun rays will assist the ozone in effecting a bleaching action on the oil.

A baffle plate 49 extends over the openings of the pipes 27 and 30 to prevent the liquid flowing down the sides of the well from entering the pipes, and each of the pipes 27 and 30 are fitted with valves 50 and 51 to close them when occasion requires; one of the valves being closed when the other is open as when either ozonated air or warm air are employed alone, and both valves being open when heated air and ozonated air are used.

After the oil has been treated a sufficient length of time to accomplish the desired results, a valve 52 in the pipe 22 is closed as is the valve 24, and the valve 41 in the branch pipe 40 is opened so that on operation of the pump the reservoir will be drained to the tank 42, and another quantity of oil to be treated placed in the reservoir. The ozonated oil is then passed through the filter.

While I have specified my invention as particularly applicable for use in treating fish oils with ozone, the invention is not limited to the treatment of fish oil, but may be employed with other oils, such as vegetable and mineral oils.

Having now particularly described and ascertained the nature of my invention and the manner in which it is to be performed, I declare that what I claim is:—

1. An apparatus for treating fish oil with ozone, comprising a chamber, an oil receptacle in the upper portion of said chamber having a perforated bottom wall for directing a rain of oil downwardly through said chamber, a reservoir for receiving the oil discharged from the chamber, a pipe leading from said reservoir to said receptacle, a pump for discharging the oil from said reservoir through said pipe to effect a circulation of oil through said chamber, an ozonator, means for passing air through said ozonator and through said chamber whereby the oil in the chamber will be subjected to the action of ozone carried by the air, and means for passing heated air through said chamber.

2. An apparatus for treating fish oil with ozone, comprising a chamber, an oil receptacle in the upper portion of said chamber having a perforated bottom wall for directing a rain of oil downwardly through said chamber, a reservoir for receiving the oil discharged from the chamber, a pipe leading from said reservoir to said receptacle, a pump for discharging the oil from said reservoir through said pipe to effect a circulation of oil through said chamber, an ozonator, means for passing air through said ozonator and through said chamber whereby the oil in the chamber will be subjected to the action of ozone carried by the air, and means for creating a pressure in the chamber.

3. An apparatus for treating fish oil with ozone, comprising a chamber, an oil receptacle in the upper portion of said chamber having a perforated bottom wall for directing a rain of oil downwardly through said chamber, a reservoir for receiving the oil discharged from the chamber, a pipe leading from said reservoir to said receptacle, a pump for discharging the oil from said reservoir through said pipe to effect a circulation of oil through said chamber, an ozonator, means for passing air through said ozonator and through said chamber whereby the oil in the chamber will be subjected to the action of ozone carried by the air, means for creating a pressure in the chamber, and means for passing warm air through said chamber.

4. An apparatus for treating fish oil with ozone, comprising a chamber, an oil receptacle in the upper portion of said chamber having a perforated bottom wall for directing a rain of oil downwardly through said chamber, and formed with perforated side walls for directing a flow of oil against the walls of said chamber, a reservoir for receiving the oil discharged from the chamber, a pipe leading from said reservoir to said receptacle, a pump for discharging the oil from said reservoir through said pipe to effect a circulation of oil through said chamber, an ozonator, and means for passing air through said ozonator and through said chamber whereby the oil in the chamber will be subjected to the action of ozone carried by the air.

JOHN C. W. STANLEY.